US006404577B1

(12) United States Patent
Sobey

(10) Patent No.: US 6,404,577 B1
(45) Date of Patent: Jun. 11, 2002

(54) TRELLIS ENCODING AND DECODING OF TRACK IDENTIFICATION INDICIA

(75) Inventor: Charles H. Sobey, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/696,509

(22) Filed: Oct. 25, 2000

(51) Int. Cl.[7] .................................................. G11B 5/09
(52) U.S. Cl. .......................... 360/49; 360/53; 360/78.14
(58) Field of Search .............................. 360/49, 53, 65, 360/46, 39, 40, 48, 78.14; 714/701, 792, 777, 769, 770, 795; 375/265, 229, 230, 232, 262, 341

(56) References Cited

U.S. PATENT DOCUMENTS 6,005,727 A * 12/1999 Behrens et al. ........... 360/77.08
6,115,198 A * 9/2000 Reed et al. .................... 360/65

OTHER PUBLICATIONS

Conway et al., "A CMOS 260Mbps Read Channel with EPRML Performance", VLSI Circuits Conference in Hawaii, Jun. 10, 1998.
Nagaraj, et al., "A Median Peak Detecting Analog Signal Processor for Hard Disk Drive Servo", IEEE J. S–S Cir., vol. 30, No. 4, pp. 461–470 Apr. 1995.
Pai, et al., "A 160–MHz Analog Front–End IC for EPR–IV PRML Magnetic Storage Read Channels", IEEE J. S–S Cir., vol. 31, No. 11,pp.1803–1816, Nov. 1996.
Shariatdoust, et al., "An Integrating Servo Demodulator for Hard Disk Drives", IEEE 1993 Custom Integrated Circuits Conf., pp. 10.6.1–5, 1993.
SSI 32P4101A PRML Read channel with EPR4, 16/17 90,6/8 ENDEC, 4–Burst Servo "Total Solutions 99" Data CD–ROM, Texas Instr., pp. 1–67 esp 12–16, Apr. 1999.
Tuttle, et al., "A 130Mb/s PRML Read/Write Channel with Digital–Servo Detection", IEEE Intntl Solid–State Circuits Conf., pp. 64–65, 1996.
Tuttle, et al., "A 130Mb/s PRML Read/Write Channel with Digital–Servo Detection", ISSCC Slide Suplement, pp. 48–50, 1996.
Alini, et al., "A 200MSample/s Trellis–Coded PRML Read/Write Channel with Digtal Servo", IEEE Intntl Sld–St Cirs. Conf., pp. 318–319 and 478–479, 1997.
"PRML Read/Write Channel IC Has Local ECC Synchronous Servo for High Density Magnetic Recording", ST Solutions (publication date unknown).

* cited by examiner

Primary Examiner—Alan T. Faber
(74) Attorney, Agent, or Firm—W. Daniel Swayze, Jr.; W. James Brady; Frederick J. Telecky, Jr.

(57) ABSTRACT

A method and apparatus for identifying a track (42) of a rotating disk (12) of a mass data storage device (10) uses EPR4 data detection techniques. The values of the encoded track identification indicia are selected so that they have a distance between any two track identification codewords that is larger than the minimum distance of the codeset from which they were selected. The identification indicia (110–113) are read from the disk (12) using a read head (18), and processed using EPR4 data equalization techniques in an EPR4 Viterbi detector (92). The Viterbi detector (92) may have a trellis in which data paths of minimum distance of the codeset from which the track identification indicia (110–113) were selected do not exist. The Viterbi detector (92) may be used also to detect data pulses (64) by switching its mode of operation from a track identification mode to a data detection mode.

19 Claims, 6 Drawing Sheets

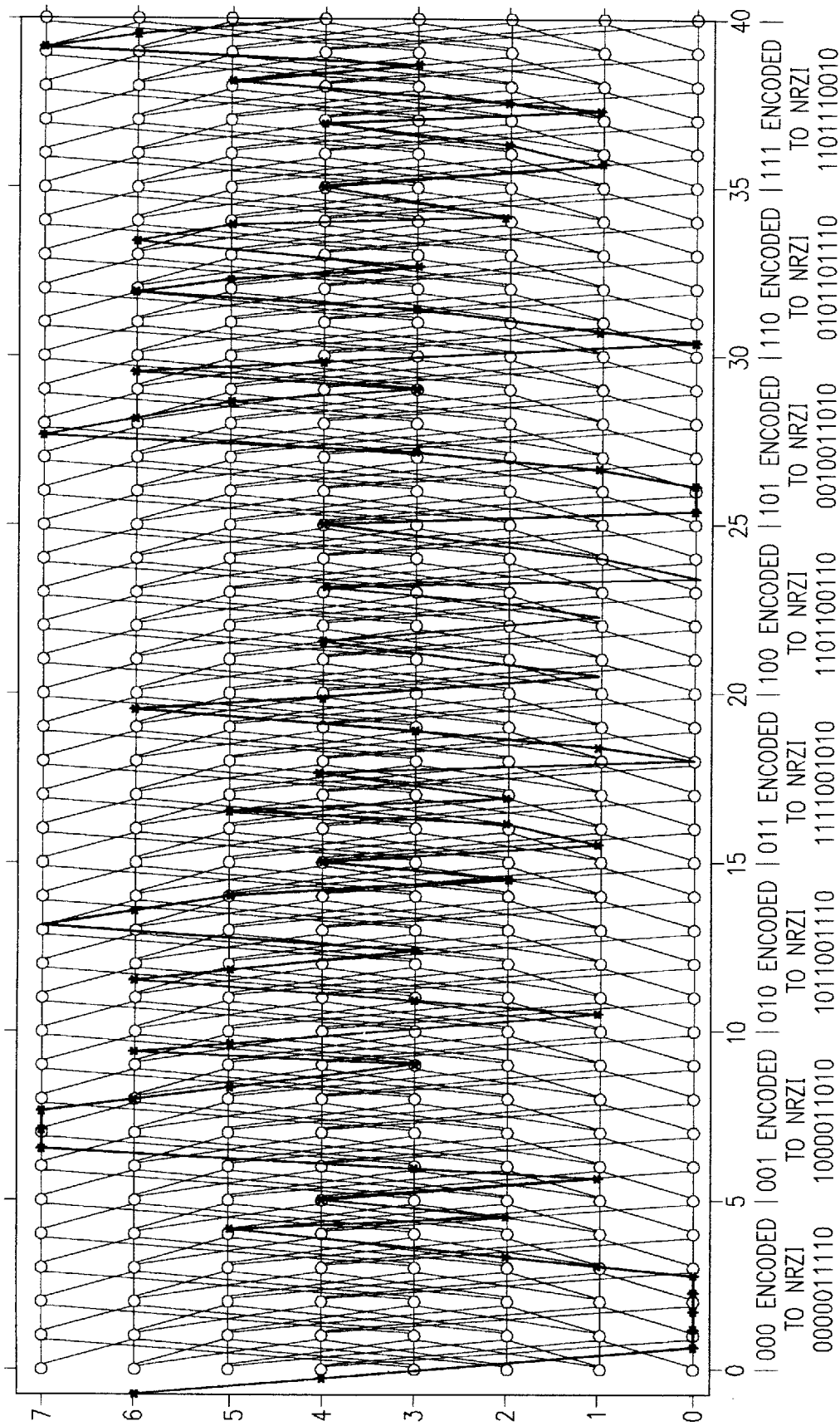

TRELLIS ENCODING AND DECODING OF TRACK IDENTIFICATION INDICIA

BACKGROUND OF THE INVENTION

1. Field of the Invention

This invention relates to improvements in mass data storage devices and methods, and more particularly to improvements in apparatuses and methods for trellis encoding, decoding, and detecting track identification indicia of a rotating disk using EPR4 data equalization.

2. Relevant Background

Mass data storage devices include tape drives, as well as well known hard disk drives that have one or more spinning magnetic disks or platters onto which data is recorded for storage and subsequent retrieval. Hard disk drives may be used in many applications, including personal computers, set top boxes, video and television applications, audio applications, or some mix thereof. Many applications are still being developed. Applications for hard disk drives are increasing in number, and are expected to further increase in the future. Mass data storage devices may also include optical disks in which the optical properties of a spinning disk are locally varied to provide a reflectivity gradient that can be detected by a laser transducer head, or the like. Optical disks may be used, for example, to contain data, music, or other information.

In the past, typically the track identification pulses are well separated from each other to enable them to be properly detected. However, there has been considerable recent pressure on disk drive manufacturers to increase the density of the data written to a disk to increase the capacity of the drive. Much effort has been directed to data detection techniques to increase the density of the data that can be contained on the disk. For example, maximum likelihood sequence detection (MLSD) and partial response (PR) filtering techniques have been developed that allow adjacent data pulses to at least partially overlap and still be properly detected. Moreover, EPR4 filtering techniques and Viterbi algorithms (VA's) have been developed that efficiently implement MLSD and enable the data to be written more closely. Specifically, EPR4 filtering shortens the response and, hence, the detection trellis. The VA efficiently implements MLSD.

However, to the best of my knowledge, others have not applied such EPR4 techniques to the detection of track identification information. Such EPR4 techniques are described in my copending patent application, application Ser. No. 09/660,174, filed Sep. 12, 2000, entitled METHOD AND APPARATUS FOR IDENTIFYING A TRACK OF A ROTATING DISK USING EPR4 DATA EQUALIZATION AND DETECTION TECHNIQUES, which is incorporated by reference herein. As a result, I believe that no efforts have been used to increase the signal to noise ratio by varying the parameters of the recorded track identification indicia, such as the minimum distance between adjacent track identification codewords. The minimum distance is the minimum distance among all pairs of the codewords in the codeset used.

There are various ways to measure the minimum distance between codewords. For example, a codeword is often thought of as a vector that is described by the values in the bit places, or coordinates, of the codeword. The distance between two codewords is then measured by the differences between the two codeword values. Typically, this distance is measured by a "Hamming distance". The Hamming distance between two words is the number of coordinates in which the two words differ. The minimum distance is the minimum Hamming distance between all distinct pairs of code words in the code. Other distance measuring techniques exist, however. For instance, a Euclidean distance may be used. Euclidean distance is measured by the familiar square root of the sum of the squares of the difference values between the two vectors. Other techniques exist, as well.

When the codewords are received, they may be decoded by selecting the codeword from the codeset that is closest to the received value. The closest codeword is that which has the smallest distance from the received value.

SUMMARY OF THE INVENTION

Thus, in light of the above, it is an object of the invention to provide a track identification method in a mass data storage-device, in which the track identification indicia are selected such that the distance between any two indicia, or track identification codewords, has a distance larger than the minimum distance of the codeset from which they are selected.

It is another object of the invention to provide a track identification method in a mass data storage device, in which the track identification indicia are detected with a trellis-type detector in which the trellis paths have distances between any two paths that are larger than the minimum distance of the codeset from which the track identification indicia are selected.

It is another object of the invention to provide a mass data storage device, in which the track identification indicia are selected such that the distance between any two indicia has a distance larger than the minimum distance of the codeset from which they are selected, and are detected with a trellis-type detector in which the trellis paths have distances between any two paths that are larger than the minimum distance of the codeset from which the track identification indicia are selected.

It is still another object of the invention to provide a mass data storage device and method of operating same in which the immunity to noise is increased, improving the bit error rate (BER) to signal to noise ratio SNR.

These and other objects, features, and advantages will become apparent to those skilled in the art from the following detailed description when read in conjunction with the accompanying drawings and appended claims.

According to a broad aspect of the invention, a method is presented for making a mass data storage device. The method includes encoding track identification indicia onto a data storage medium of the mass data storage device with a code having a code distance greater than a minimum distance of a codeset containing the encoded track identification indicia. A detector is provided for detecting the track identification indicia for providing detected track identification indicia signals. A decoding trellis is provided in the detector for decoding the track identification indicia signals. The decoding trellis does not contain detection paths of the minimum distance and uses a data equalization technique having five target values (+2, +1, 0, −1 and −2), with pulses having non-zero values existing over three sample times, to identify a track of a rotating disk of the mass data storage device.

According to another broad aspect of the invention, a method is presented for operating a mass data storage device. The method includes detecting track identification indicia prerecorded on the disk and processing the detected track identification indicia using a data processing technique that does not contain detection paths of a minimum distance of a codeset containing the track identification indicia to identify a track of a rotating disk of the mass data storage device.

According to yet another broad aspect of the invention, a mass data storage device is presented. The Mass data storage device includes a rotating disk having a plurality of tracks encoded thereon adapted to be read by a transducer moveable in relationship thereto. A plurality of track identification indicia is recorded on the disk in respective association with the plurality of tracks. The track identification indicia are encoded with a code having a code distance greater than a minimum code distance of a codeset containing the track identification indicia.

BRIEF DESCRIPTION OF THE DRAWINGS

A preferred embodiment of the invention is shown in the accompanying drawings, in which:

FIG. 10 is an NRZI trellis diagram that shows the detected paths that result from the decoding scheme of FIG. 9 for respective NRZI encoded data combinations, according to a preferred embodiment of the invention.

In the various figures of the drawings, like reference numerals are used to denote like or similar parts.

DETAILED DESCRIPTION OF THE PREFERRED EMBODIMENTS

Figure 1:
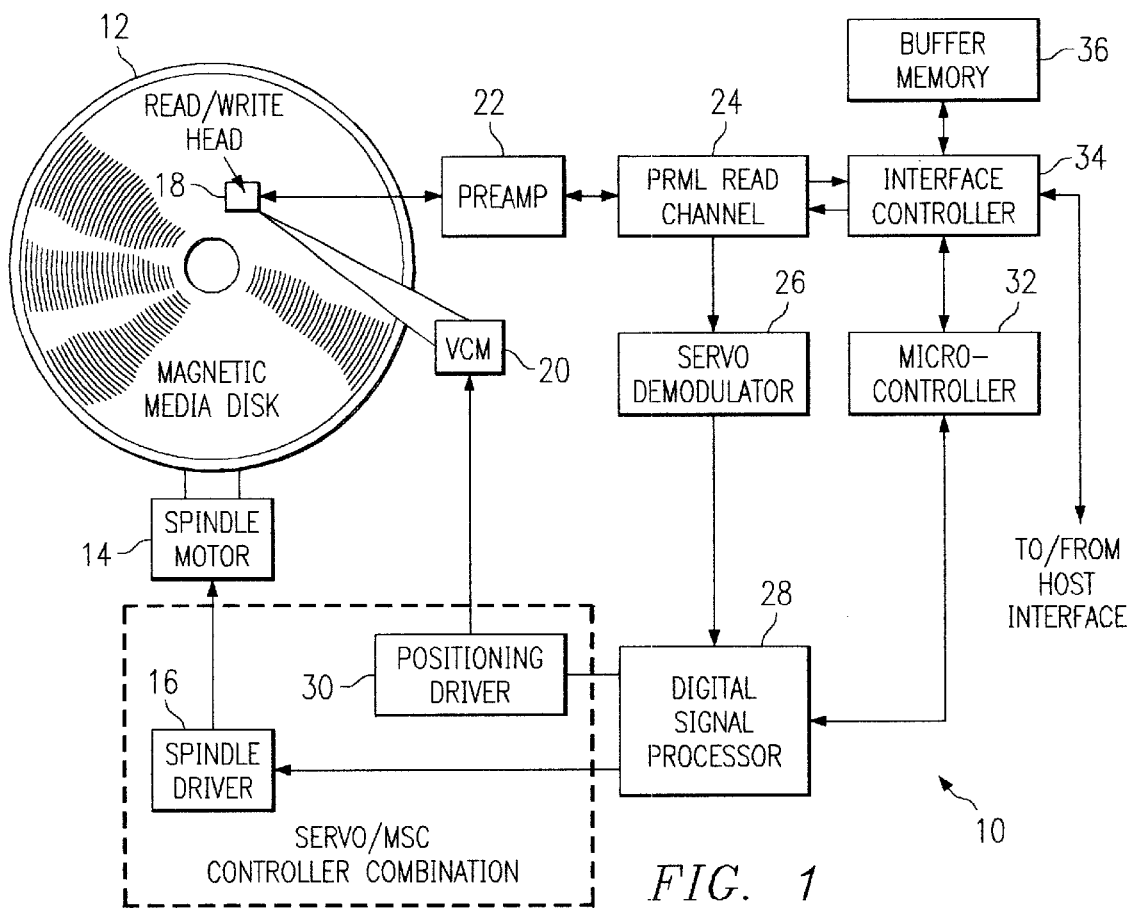
FIG. 1 is a block diagram of a disk drive system, illustrating the environment in which the invention may be practiced.

FIG. 1 is a block diagram of a disk drive system 10, which represents the environment in which the invention may be practiced. The system includes a magnetic media disk 12 that is rotated by a spindle motor 14 and spindle driver circuit 16. A data transducer or head 18 is selectably radially locatable by a voice coil motor (VCM) 20 to track along circumferential tracks of the disk, illustrated in FIG. 2, described below.

The tracks may contain magnetic states that contain information about the tracks, such as track identification data, location information, synchronization data, as well as user data, and so forth. The head 28 may be used to both record user data and read user data back from the disk 12. The head 28 also may be used to detect signals that identify the tracks and sectors at which data is written, and to detect servo bursts that enable the head to be properly laterally aligned with the tracks of the disk, as below described.

Analog electrical signals that are generated in response to resistance changes in the head 18 due to the magnetic signals recorded on the disk 12 are preamplified by a preamplifier 22 for delivery to PRML (Partial Response Maximum Likelihood) read channel circuitry 24, details of which are described below with reference to FIG. 6. Servo signals, below described in detail, are detected and demodulated by one or more servo demodulator circuits 26. Typically, a servo decoder is provided to decode track identification data, and a servo demodulator is provided to detect head alignment bursts on the tracks. The servo signals are processed by a digital signal processor (DSP) 28 to control the position of the head 18 via a positioning driver circuit 30. The servo data that is read and processed may be analog data that is interpreted by the DSP 28 for positioning the head 18.

A microcontroller 32 is typically provided to control the DSP 28, as well as an interface controller 34 to enable data to be passed to and from a host interface (not shown) in known manner. A data memory 36 may be provided, if desired, to buffer data being written to and read from the disk 12.

Figure 2:
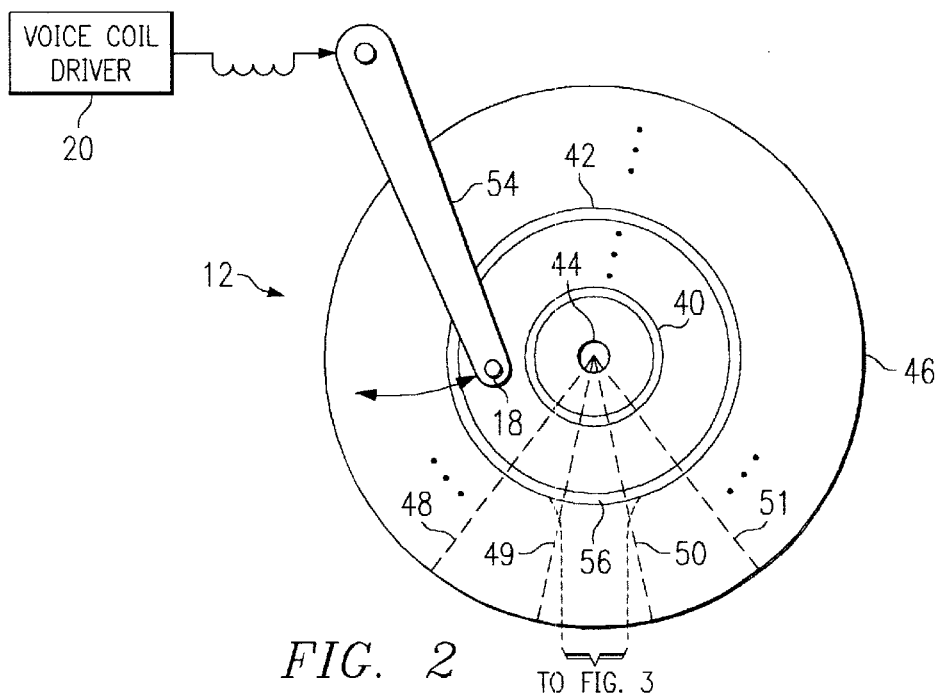
FIG. 2 is a diagram showing a typical arrangement of selectable radial tracks of the disk of FIG. 1.

The data rings of the disk 12 of FIG. 1 are illustrated in FIG. 2. The disk may be coated with a magnetic material to which data and other information are written in a number of concentrically located tracks or rings 40 . . . 42 . . . The tracks typically contain user data sectors and servo sectors arranged in concentric cascading rings from the inside diameter 44 of the disk at the hub to the outside diameter 46 of the disk at the edge. Evenly spaced radial lines 48–51 are also shown emanating from the hub 44 to the edge 46. (The lines 48–51 do not actually exist in a physical device, but are shown for purposes of illustrating the alignment of the fields of the tracks, as described below.) The lines 48–51 correspond to the location of the servo sectors at each respective intersection of the lines 48–51 with the rings 40 . . . 42 . . . Generally, there are two or more data sectors per servo sector.

A servo sector exists at the junction of each of the radial lines and its respective track. It should be noted that servo sectors are typically written by the disk drive manufacturer by a device known as a servo writer. These servo sectors are never re-written, in normal drive operation.

The read/write head is positioned by an arm 54 that is pivotally attached to allow the read/write head 18 to be radially moved inwardly and outwardly to selected radial distances of the disk 12 to tracks 40 . . . 42 . . . identified by the desired track identification number. The radial position of the read/write head arm is controlled in a known manner by the "voice coil" motor 20 that receives positioning signals from the positioning driver circuit 30.

Figure 3:
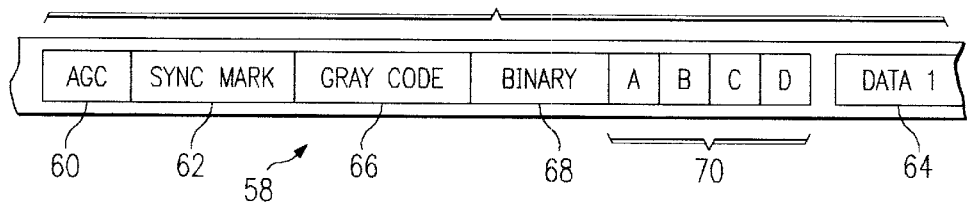
FIG. 3 is an expanded diagram showing a wedge portion of a one of the rings or tracks within one of the tracks of FIG. 2, showing the various data areas therein.
Figure 7:
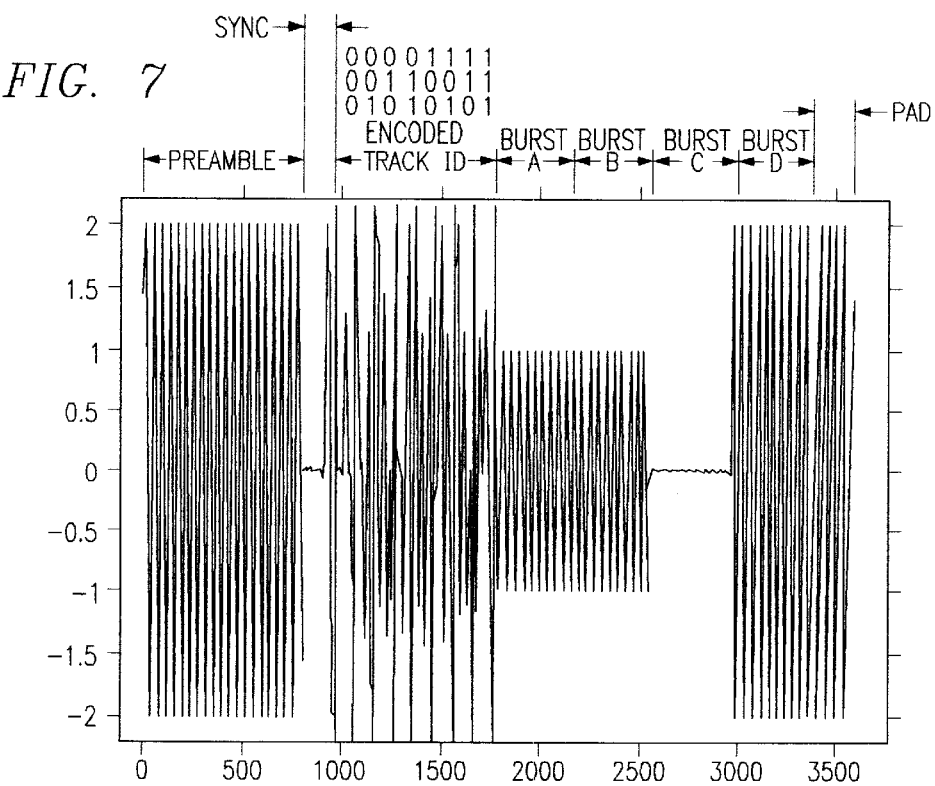
FIG. 7 is a graph showing the various signals of the wedge portion of FIG. 3.

The layout 56 of one of the rings or tracks within one of the sectors is shown in FIG. 3, details of which are shown in FIG. 7 below. The sector portion may be identical to other sector portions that repeat continuously around the ring, and includes a number of servo sectors that separate respective user data sector regions. Each user data sector region may include a number of data sectors.

More particularly, each track has one or more servo sectors 58 located at spaced locations along the track. Each servo sector 58 has a number of fields, each for providing information for location or control of the head. Typically, for example, each servo sector includes a field that contains a preamble field 60, which, when read, enables AGC and timing circuitry associated with the disk to automatically adjust the gain in the head amplifiers and acquire the proper timing to enable the following data to be properly detected. The preamble field also is used to ensure that the trellis of the Viterbi detector starts in the correct state. Typically following the preamble burst is a field 62 that contains one or more sync marks so that the longitudinal position of the head relative to the track of interest can be determined. The sync marks 62 may be used, for example, to enable subsequent fields, such as the user data sectors 64 to be located by counting a predetermined elapsed time from the time that the sync marks are detected.

A Gray code field 66 may follow the sync mark field 62 in the servo sector 58. The Gray code field 66 may contain Gray code data from which the identification of the particular radial track over which the head is positioned can be established. Following the Gray code field 66 is a field 68 containing binary data, for example, to contain longitudinal track identification information, so that the identity of each track region between adjacent servo sectors can be established. The Gray code and the track identification information are referred to herein as "track identification pulses" or "track identification indicia." After the binary data field 68, a number, typically four, of burst fields 70 are presented for more precision alignment of the head laterally with respect to the selected track. It should be noted that the Gray code and track identification indicia typically are also coded in accordance with a run-length-limited (RLL) code, as known in the art.

According to a preferred embodiment of the invention, a method is presented for identifying a track of a rotating disk of a mass data storage device. The tracks of the disk are identified by track identification indicia that are written onto the disk during manufacture using standard servo writing apparatuses, and, according to the invention, may be written with at least some of said track identification indicia pulses at least partially overlapping. As will become apparent below, the track identification values are coded with a code that ensures that the minimum distance between the samples of any two adjacent track identification values is greater than the minimum distance of the codeset into which the data recorded on the disk is coded. This code also provides RLL encoding. This greatly reduces the complexity and increases the reliability of the detection of the subsequently read back track identification indicia, as discussed below in detail.

More particularly, the track identification data can be recorded specifically for subsequent EPR4 trellis code detection, according to the following Table I:

TABLE I

| EPR4 Trellis Code Data Flow | | | | |
|---|---|---|---|---|
| Data d1d2d3 (1) | RLL Encoder (2) | Precoder $1/(1 \oplus D^2)$ i.e. = 00 (3) | NRZI Encoded Data (4) | $I_{write}$ (5) |
| 000 | 0000010001 $\overline{d1}$ $\overline{d2}$ $\overline{d3}$ | 0000010100 | 0000011110 | -1-1-1-1-1+1-1+1-1-1 |
| 001 | 1100010111 | 1111101100 | 1000011010 | +1+1+1+1+1-1+1+1-1-1 |
| 010 | 1110101001 | 1101110100 | 1011001110 | +1+1-1+1+1+1-1+1-1-1 |
| 011 | 1000101111 | 1010001100 | 1111001010 | +1-1+1-1-1-1+1+1-1-1 |
| 100 | 1011010101 | 1001000100 | 1101100110 | +1-1-1+1-1-1-1+1-1-1 |
| 101 | 0011010111 | 0011101100 | 0010011010 | -1-1+1+1+1-1+1+1-1-1 |
| 110 | 0111011001 | 0110110100 | 0101101110 | -1+1+1-1+1+1-1+1-1-1 |
| 111 | 1011001011 | 1001011100 | 1101110010 | +1-1-1+1-1+1+1+1-1-1 |

In Table I, the possible data words by which the track identification indicia are defined are shown in column 1, and are denoted by respective designations d1, d2, and d3. When the data bits d1, d2, and d3 are encoded by an RLL code, they appear as ten bit words, as shown in column 2. The encoded data bits appear at bit positions 4, 7, and 9 (from the left), which are underlined for clarity.

The RLL encoded words are precoded in a precoder to the values shown in column 3. The precoded values are used to NRZ modulate the write current polarity being defined, as shown in column 5.

Figure 4:
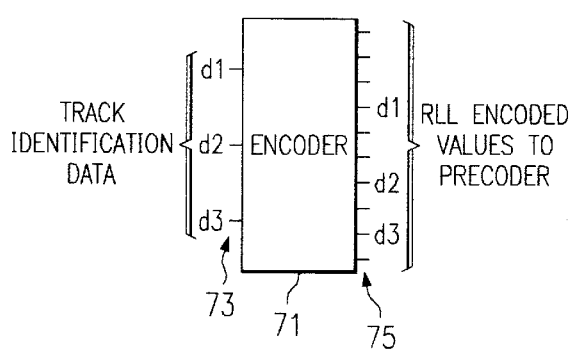
FIG. 4 is one embodiment of an encoder that can be used to develop RLL encoded values from the track identification data in which the distance between any two encoded values is larger than the minimum distance of a codeset of the waveform sample sequence.

One embodiment of an encoder 71 that can be used to develop the RLL encoded values from the track identification data is shown in FIG. 4, to which reference is now made. The track identification data is applied to input lines 73, denoted d1, d2, and d2, and the encoded values are delivered on output lines 75. On the output lines 75, the track identification values d1, d2, and d3 appear on lines 4, 7, and 9 as shown, and as can be seen from Table I above.

The circuitry of the encoder 71 can be constructed or realized using software tools for integrated circuit design. Such software tools are often referred to as high-level description language (HDL) or Very High Speed Integrated Circuit Hardware Description Language (VHSIC HDL or VHDL) design tools. Such software tools can transform circuit definitions, specifications, and functions into integrated circuit hardware, without a need to specify any particular hardware implementation, layout, or design.

Examples of such software tools are Verilog and tool call design compilers available from Synopsys, Inc. of Mountain View, Calif., the Behavior to Structure Translator (BEST) synthesis tool developed by Unisys Corporation, the Design-Book Synthesis tool from Escalade, and the Synergy synthesis tool available from Cadence Design Systems, Inc.

It should be noted that the RLL encoding is performed such that a distance that is larger than the minimum distance of the code from which the subset words used for track identification are selected, results. In other words, the code that is used increases the minimum distance between paths through the detection trellis, as below described, to ensure that the minimum distance paths are never written. Referring to Table I above, the resulting EPR4 signal samples for any pair of data words in the first column are separated by an Euclidean distance of at least 8, as listed in Table II below. It should be noted that although a Euclidean distance is illustrated in Table II, the principles of the invention apply equally advantageously if the minimum distance is defined by some other distance defining technique.

TABLE II

Trellis Code Squared Distances

|     | 001 | 010 | 011 | 100 | 101 | 110 | 111 |
|-----|-----|-----|-----|-----|-----|-----|-----|
| 000 | 16  | 12  | 12  | 8   | 16  | 8   | 14  |
| 001 |     | 12  | 8   | 14  | 10  | 12  | 8   |
| 010 |     |     | 24  | 12  | 24  | 14  | 12  |
| 011 |     |     |     | 20  | 16  | 8   | 12  |
| 100 |     |     |     |     | 20  | 22  | 24  |
| 101 |     |     |     |     |     | 16  | 12  |
| 110 |     |     |     |     |     |     | 10  | using EPR4 data equalization techniques. The EPR4 data equalization techniques enable the partially overlapping signals to be separated and decoded.

Thus, to practice the method of the invention, the data may be written closer together than heretofore permitted using peak detection schemes. The indicia may be decoded by a Viterbi detector, preferably the same Viterbi detector that is used to decode the data that is contained on the track. However, since the track identification information can be coded using only eight possible basic data combinations or sub-sequences, the Viterbi can be configured in track identification operation to detect only the necessary eight sub-sequences. Of course, the track identification indicia are typically encoded with a Gray code to facilitate track seek operation, and may be encoded with an RLL code, as well. This invention does not change this; that is, the track identification information may still be encoded as it was in the past, but may be recorded more densely on the disk.

Since the track identification data was specially selected to have a distance between any two track identification words that is larger than the minimum distance of the codeset by which data is normally written to the disk, the trellis of the detector may be configured to omit codewords that will not occur, and, more particularly, to omit all codewords that are of exactly the minimum distance of the codeset. Thus, not only is the signal to noise ratio performance of the detector improved, but the speed in which the track identification indicia can be detected is also improved, since fewer Viterbi paths exist.

A table of the EPR4 Trellis code data flow is set forth in the following Table III:

TABLE III

| EPR4 Trellis Code Data Flow | | | |
|---|---|---|---|
| Readback Samples (phase shift relative to $I_{write}$) (1) | VA Output (NRZ) (2) | Postcoder1⊕$D^2$ i.e. = 00 (3) | RLL Encoder (4) |
| -1  0  0  0  0  +1  +1  0  0  -1 | 0000010100 | 0000010001  $\overline{d1}$ $\overline{d2}$ $\overline{d3}$ | 000 d1d2d3 |
| 0  +2  +2  0  0  -1  -1  +1  0  -2 | 1111101100 | 1100010111 | 001 |
| 0  +2  0  -1  +1  +1  -1  -1  0  -1 | 1101110100 | 1110101001 | 010 |
| 0  +1  0  0  -1  -1  +1  +2  0  -2 | 1010001100 | 1000101111 | 011 |
| 0  +1  -1  0  +1  -1  -1  +1  +1  -1 | 1001000100 | 1011010101 | 100 |
| -1  0  +1  +2  +1  -1  -1  +2  0  -2 | 0011101100 | 0011010111 | 101 |
| -1  +1  +2  0  -1  +1  0  -1  0  -1 | 0110110100 | 0111011001 | 110 |
| 0  +1  -1  0  +1  0  +1  +2  -1  -2 | 1001011100 | 1011001011 | 111 |

Upon readback, the track identification indicia that are recorded on the disk are read using the read head. Since the data was written so that the minimum distance paths are never written, corresponding minimum distance paths in the detection trellis should never be selected as the output of the Viterbi algorithm. Since the track identification indicia may partially overlap, merely using an amplitude peak detector may not properly discern between adjacent indicia. Thus, the signals that are developed by the read head are processed The readback samples, phase shifted relative to $I_{write}$, are shown in column 1. The NRZ Viterbi detector output is shown in column 2, and the output of the postcoder is shown in column 3. It can be seen that the postcoded values in bit positions 4, 7, and 9 from the left, exactly match the original data bits d1, d2, and d3. This greatly simplifies the structure of the decoder 77 required to deliver the RLL decoded values, shown in column 4.

Figure 5:
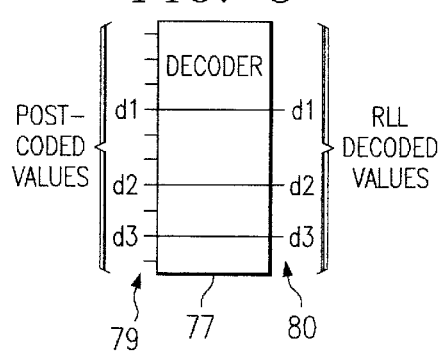
FIG. 5 is one embodiment of a decoder that can be used to decode the readback values that were recorded using the RLL encoded values of FIG. 4.

More particularly, a block diagram of a decoder that can be used is shown in FIG. 5, to which reference is now made. Postcoded values are applied to the input 79, and because the RLL decoded values directly appear at data bit positions d1, d2, and d3, as shown, Those bit positions may be directly used at the output 81.

Figure 6:
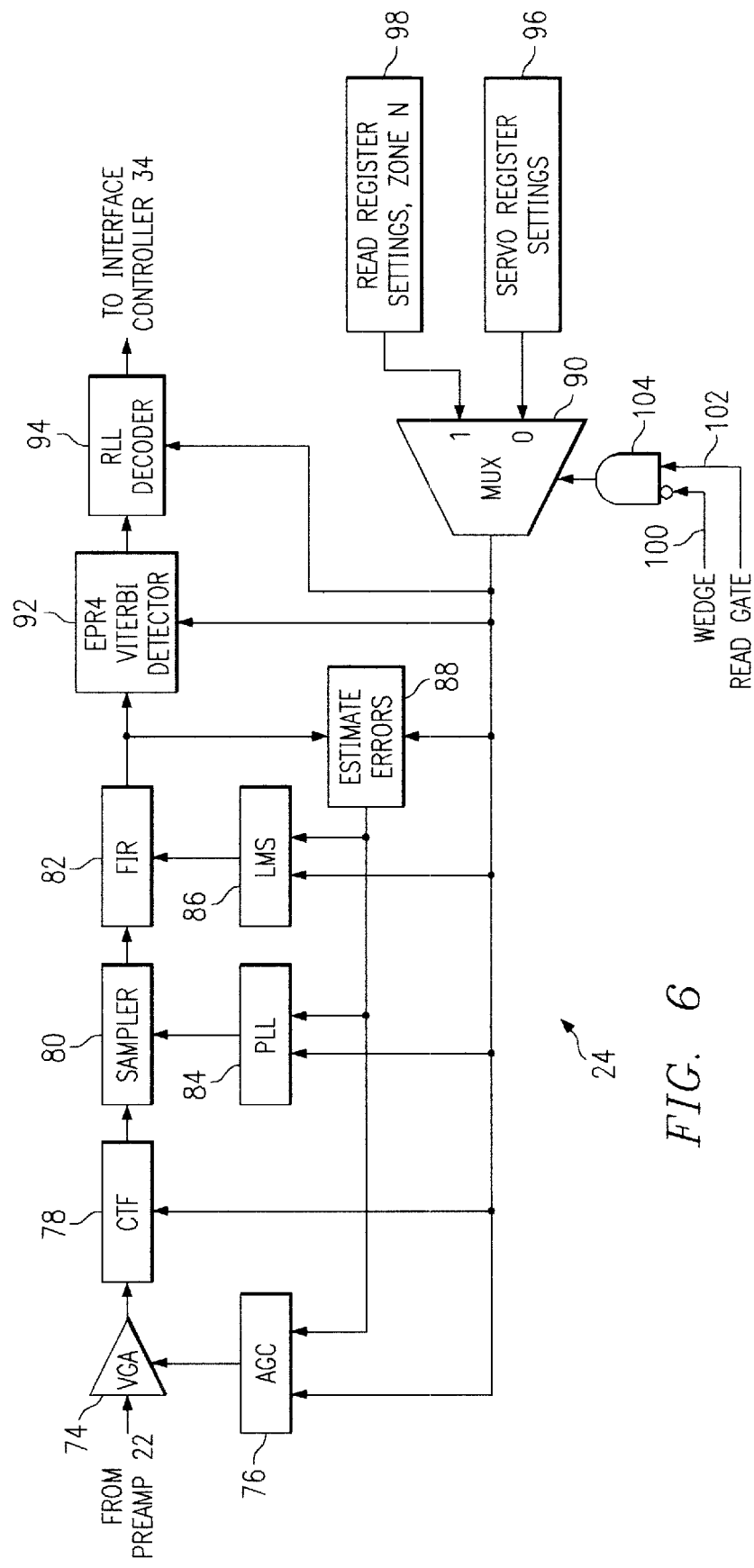
FIG. 6 is a block diagram of the read channel of FIG. 1, showing an embodiment in which the Viterbi detector thereof is selectively switchable from a track identification mode to a data detection mode.

To detect the track identification indicia, as well as the user data in the track being read, the read channel 24 may be configured in the manner shown in FIG. 6, to which reference is now additionally made. A variable gain amplifier (VGA) 74 of the read channel 24 receives input signals from the preamplifier 22, shown in FIG. 1. The variable gain amplifier 74 is in a feedback circuit that includes an automatic gain control circuit (AGC) 76 to control the amplitude of the detected signal to enable the remaining read channel circuitry to properly process it.

The output from the VGA 74 is filtered, first with a continuous time filter (CTF) 78, then after being sampled by a sampler circuit 80, by a finite impulse response (FIR) filter 82. The output of the FIR filter 82 is fed back to the AGC 76 to control the gain of the VGA 74, but is also used to control the timing of the sampler 80 via phase locked loop circuit 84 and to control the coefficients of the FIR filter 82 via least means squared (LMS) adaptation circuit 86. Those skilled in the art will appreciate that there are other possible arrangements of these blocks. A circuit 88, denoted estimate errors, is used to modify the feedback signal in dependence upon the values produced at the output of the FIR filter 82 and the output of a multiplexer (MUX) 90, as below described.

The output from the FIR filter 82 is detected by an EPR4 Viterbi detector 92, details of which are also below described. The output from the EPR4 Viterbi detector 92 are then run-length-limited (RLL) decoded by an RLL decoder 94, to deliver the read channel output to the interface controller 34 (FIG. 1) and to the host (not shown).

According to one embodiment of the invention, the read channel circuitry of FIG. 6 can be switchably used to detect either the track identification indicia read from the disk 12 or the user data read therefrom. This is accomplished by the MUX 90, which has as one input the servo register settings 96, and which has another input the read register settings 98 for any particular zone, denoted "zone N". (A zone is a group of consecutive tracks that have the same data rate.) The output from the multiplexer controls the AGC 76, PLL 84 and LMS 86 feedback elements, as well as the EPR4 Viterbi detector 82 and RLL decoder 94. The selection between the servo register settings 96 and the read register settings 98 is controlled by whether a "wedge" signal 100 and a "read gate signal" 102 are applied to the MUX input via an AND gate 104.

In operation, when the "wedge" signal 100 is not applied and the read gate signal 102 is applied, the read register settings are applied to the MUX 90 to configure the circuitry of the read channel 24 to read the data from the disk 12, in normal fashion. On the other hand, when the "wedge" signal 100 is applied, the MUX 90 is configured to apply the servo register settings 96 to configure the read channel circuitry, and, in particular, the settings of the trellis of the Viterbi detector 92, to read and detect the track identification indicia read from the disk 12.

With reference now additionally to FIG. 7, the waveforms of the various fields of a servo "wedge" are shown. The binary field 68 of FIG. 3 has been omitted, for clarity. (It is noted that in many applications, various ones of the wedge fields may be rearranged or omitted, depending upon the particular setup of the drive on which the fields are used.) The waveforms of FIG. 8 are shown with an expanded horizontal time scale in FIG. 7, to which reference is now additionally made.

As mentioned, according to the invention, the waveforms of the track identification indicia 64 may be compressed and detected using EPR4 processing techniques. Thus, each of the NRZI (Non-Return-to-Zero Inverse) tribit encoded track indicia 110–117 are compressed from their normal width, indicated by vertical start time lines 118–125 to compressed time formats. This may result in overlap of tribit information, but which can nevertheless be discriminated and detected using EPR4 techniques. It can be seen that the NRZI encoded sample values for the tribit waveforms 110–117 representing "000", "001", "010", "011", "100", "101", "110", and "111" shown are respectively "0000011110", "1000011010", "1011001110", "1111001010", "1101100110", "0010011010", "0101101110", and "1101110010".

To be enabled to detect the track identification indicia, the construction of the EPR4 Viterbi detector 92 may be modified from that of a standard EPR4 Viterbi detector. Thus, the Viterbi detector may be modified so that it can selectively detect only those possible binary sequences which represent track identification information.

Figure 8:
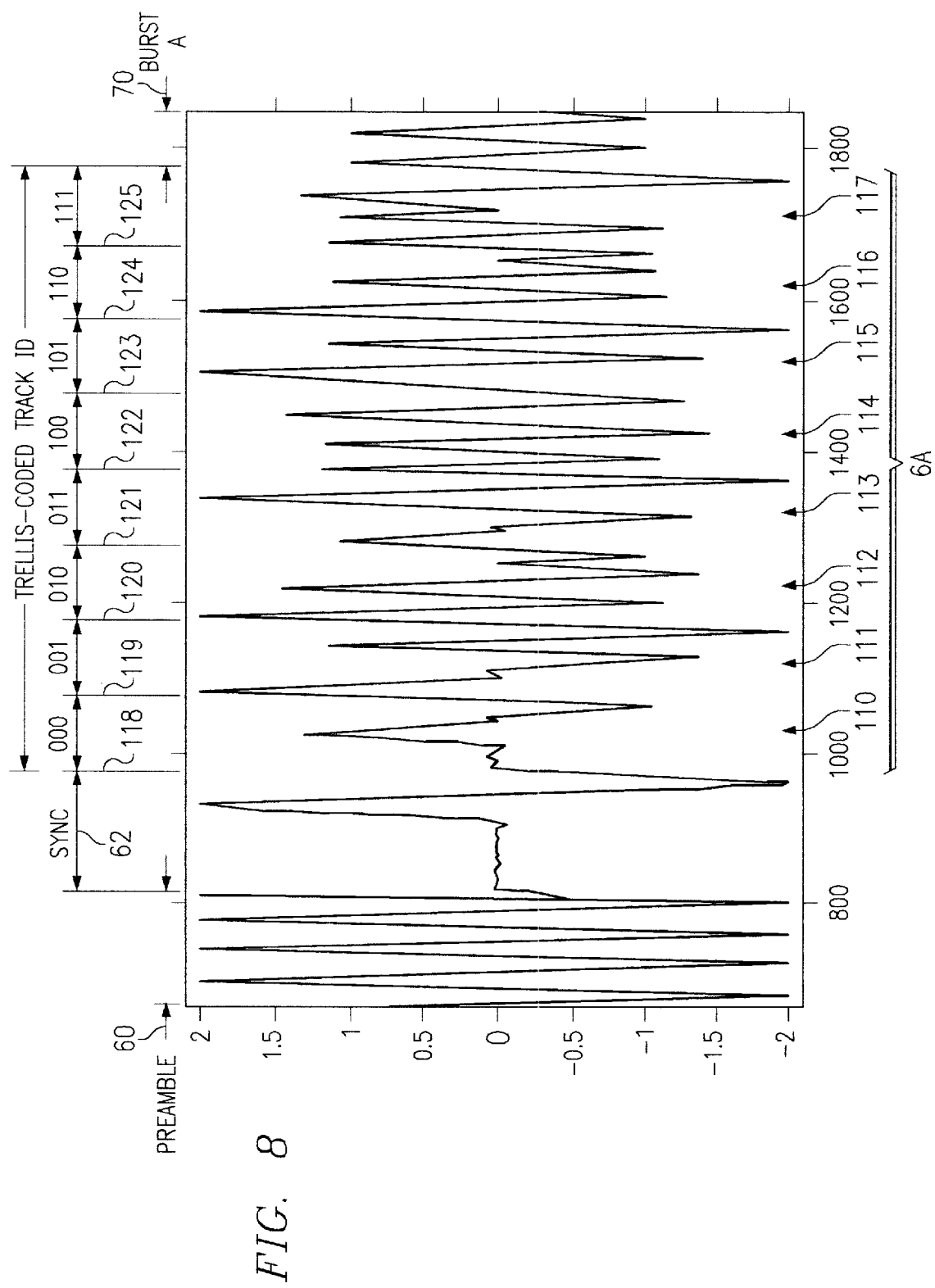
FIG. 8 is a time-expanded view of the preamble, sync and track ID portions of the graph of FIG. 7.
Figure 9:
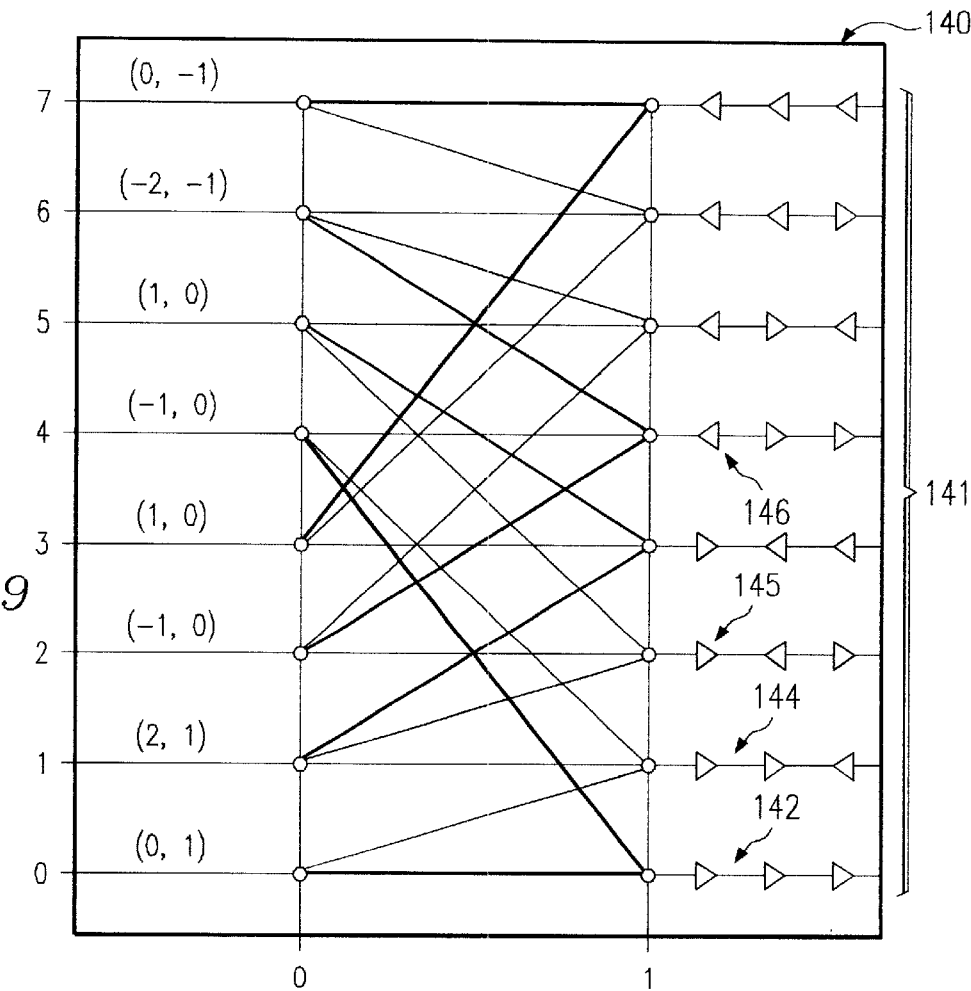
FIG. 9 is a state diagram of a particular EPR4 scheme for decoding the various NRZI track identification indicia combinations of FIG. 8, according to a preferred embodiment of the invention.

A state diagram 140 of a particular EPR4 scheme for decoding the various NRZI track identification indicia combinations of FIG. 8, according to a preferred embodiment of the invention, is shown in FIG. 9, to which reference is now additionally made. The magnetic domains that are written on the disk are represented by the arrows 141 on the right side of the diagram 140. The arrows are directed to either the right or left, depending upon the manner in which the encoded data was originally written, in known manner, and the various domain orientations correspond to the various states of the diagram. The domains are decoded in sets of three, beginning with zero, and shifting to the right one position as each additional domain from the disk is read.

For example, if the track identification data combination of "111", which is represented by NRZI 1101110010, has been recorded on the disk, the manner by which it is decoded is as follows, assuming a sync mark that leaves the media in state 4. The state diagram 140 starts in state 4, in which the domain arrows 146 representing the history of the domains point left, right, right. When the first domain of the NRZI sequence is read, it represents a domain change, corresponding the NRZI "1". Thus, the domain sequence becomes arrows 144 that now have the first two pointing right and the third pointing left. This corresponds to state 1. The next magnetic domain that is read also represents a domain change, corresponding to the NRZI "1". This is seen in the diagram by arrows 145 (state 2). The next magnetic domain that is read shows no change in direction. No change in magnetic domain direction corresponds to an NRZI "0", and corresponds to state 4 in the diagram, and is represented by arrows 146. This process is continued as the remaining magnetic domains are read and the NRZI code "1101110010" is decoded following the states of the state diagram 140.

The sample values corresponding to each state transition are determined by the number pairs on the left side of the state diagram 140. A zero NRZI value corresponds to the value on the left, and a one NRZI value corresponds to the value on the right. For example, following the decoded states of NRZI data representing a data combination "000", which is "0000011110" the sample values −10000+1+100−1result.

The state paths defined for each defined sequence are shown in the NRZI trellis diagram of FIG. 10, to which reference is now additionally made. Thus, the Viterbi trellis paths are outlined by the basic data combinations or sequences of the eight possible track identification indicia, namely, "000", "001", "010", "011", "100", "101", "110", and "111". The track identification indicia are NRZI encoded, respectively, to "0000011110,""1000011010", "1011001110", "1111001010", "1101100110", "0010011010", "0101101110", and "1101110010." Each of these indicia can be developed from the state diagram 140, in the manner described above. As can be seen, state 0 is three magnets to the right (−1−1−1) and state 7 is three magnets to the left (+1+1+1). Thus, the basic triples of track identification information described above provide the basic building blocks from which an entire detector can be constructed. The eight combinations correspond specifically to target value sequences.

Figure 11:
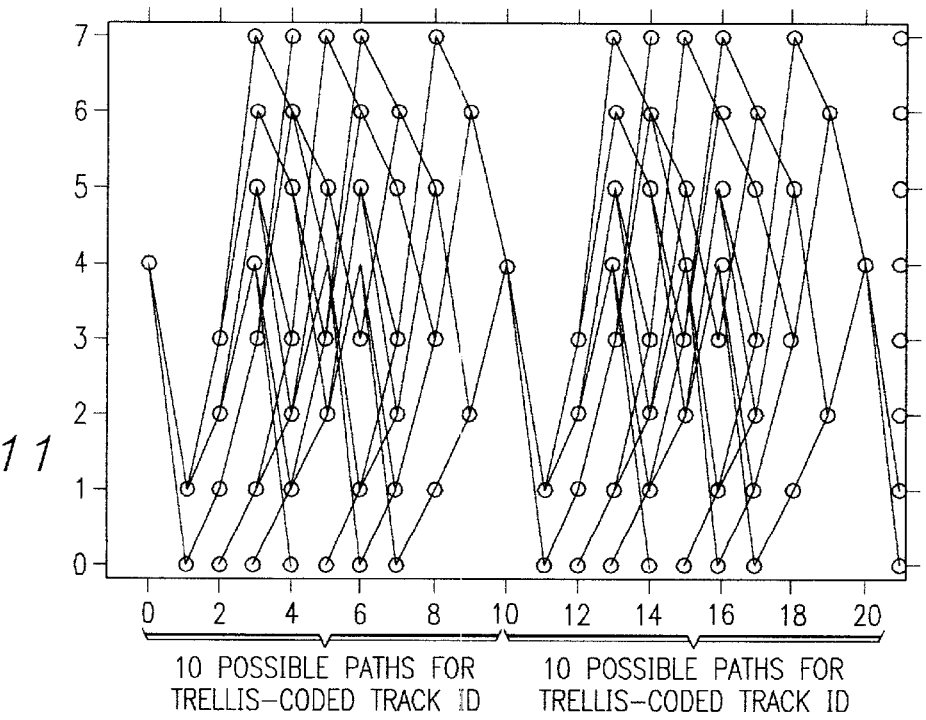
FIG. 11 is a diagram showing a time varying trellis structure for an eight-state EPR4 Viterbi detector, that can detect NRZI encoded track identification data combinations, with paths removed that do not correspond to valid coded tribit sequences, according to another preferred embodiment of the invention.

FIG. 11, to which reference is now additionally made, is a diagram showing a time varying trellis structure for an eight-state EPR4 Viterbi detector, which can optionally be implemented to detect NRZI encoded track identification data combinations. The shapes of the various possible paths will be recognized to correspond to the shapes of the basic data combinations "000", "001", "010", "011", "100", "101", "110", and "111" described above with respect to FIGS. 9 and 10. In the trellis structure of FIG. 11, the tribit sequences or paths that do not correspond to valid coded tribit sequences are removed. Every tenth bit is forced to go through state 4. Thus, the ten-sample structure shown repeats every $10^{th}$ bit throughout the track identification.

By removing the data sequences that do not correspond to the minimum distance of the code from which the sequences are extracted, the minimum distance is increased from $4^{1/2}$ to $8^{1/2}$. This represents a 3 db gain. However, the trade-off is that a 3/10 RLL code needs to be used, in the embodiment illustrated, rather than a 1/3 or 3/9 RLL code. This reduces the code rate by about 11%, and requires a modification of the Viterbi algorithm used. The complexity of the RLL encoder also may be increased.

It will be appreciated that the EPR4 Viterbi detector used to detect track identification may be the same detector as used to detect data in normal operation. For example, in the trellis diagram of FIG. 10, all of the trellis states are present, and a Viterbi constructed to implement the trellis illustrated will detect the abbreviated track identification data as well. Preferably, however, the detector may be modified so that only the paths that will be encountered in the abbreviated track identification coding are used. This has a number of advantages; for example, in power savings, detection error reduction, and so forth.

The manner by which the EPR4 Viterbi detector may be switched to remove the unused paths in track identification mode preferably is by turning off the non-used paths of the Viterbi, or by adjusting the path weights of the Viterbi so that the non-allowed paths in a eight-path embodiment do not occur. Of course, as will be apparent to those skilled in the art, other Viterbi trellis arrangements may be used.

It should be noted that although the invention has been described with specific reference to EPR4 techniques, it need not be limited strictly thereto. Thus, for example, the target values of EPR4 may have a 2:1 ratio between the absolute value of the largest and smallest non-zero sample values. However, a generalized target may also be used, which does not keep an integer relationship between the target values. For instance, a pulse defined over a fixed number of sample values, such as three, may be used. The sample values may be "A", "B", and "C". In EPR4, "A" may equal 1, "B" may equal 2, and "C" may equal 1. Moreover, the negative portion of the pulse may still have different values, for example, "D", "E" and "F", where "D", "E", and "F" may, but not necessarily equal "−A", "−B", and "−C". This is referred to herein as "generalized EPR4," or "generalized eight-state" trellis decoding.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A method for using a mass data storage device, comprising:

encoding the track identification indicia wherein the encoded track identification indicia have a distance between any two indicia that is greater than a minimum distance of a codeset in which the track identification indicia are contained;

detecting said track identification indicia for providing detected track identification indicia signals; and decoding with a decoding trellis said track identification indicia signals, wherein said decoding trellis does not contain detection paths of said minimum distance, said decoding trellis using a data equalization technique having a plurality of target values, to identify a track of a rotating disk of said mass data storage device, wherein said decoding trellis is matched to EPR4 target values.

2. The method of claim 1 wherein said minimum distance is a minimum Hamming distance.

3. The method of claim 1 wherein said minimum distance is a minimum Euclidean distance.

4. The method of claim 1 wherein said plurality of target values is normalized to 1, 2, and 1, and −1, −2, and −1.

5. The method of claim 1 wherein said plurality of target values is other than 1, 2, and 1, and other than −1, −2, and −3.

6. The method of claim 1 wherein said processing of said detected track identification indicia comprises processing said detected track identification indicia using a Viterbi detector.

7. A method for operating a mass data storage device, comprising:

detecting track identification indicia prerecorded on said disk; and processing said detected track identification indicia using a data processing technique that does not contain detection paths of a minimum distance of a codeset in which said track identification indicia are contained to identify a track of a rotating disk of said mass data storage device, wherein said processing comprises using a decoding trellis matched to EPR4 target values.

8. The method of claim 7 wherein said processing comprises using a decoding trellis is matched to three positive target values normalized to 1, 2, and 1, and said three negative target values normalized to −1, −2, and −1.

9. The method of claim 7 wherein said processing comprises using a decoding trellis matched to three positive target values other than 1, 2, and 1, and said three negative target values other than −1, −2, and −1.

10. The method of claim 7 wherein said processing comprises processing said detected track identification indicia using a Viterbi detector.

11. A mass data storage device, comprising:

a rotating disk;

a plurality of tracks encoded on said rotating disk, adapted to be read by a transducer moveable in relationship thereto; and a plurality of track identification indicia recorded on said disk in respective association with said plurality of tracks;

said track identification indicia being encoded with a code having a code distance greater than a minimum code distance of a codeset that contains said track identification indicia, wherein equalization of said track identification indicia is adapted such that samples can be detected with detector having a decoding trellis matched to at least three positive and three negative target values, to identify a track of a rotating disk of said mass data storage device, and wherein said decoding trellis is matched to EPR4 target values.

12. The mass data storage device of claim 11 wherein said track identification indicia is encoded with a code having a code distance greater than a minimum Hamming distance.

13. The mass data storage device of claim 11 wherein said track identification indicia is encoded with a code having a code distance greater than a minimum Euclidean distance.

14. The mass data storage device of claim 11 wherein said decoding trellis is matched to EPR4 target values.

15. The mass storage device of claim 11 wherein said three positive target values are normalized to 1, 2, and 1, and said three negative target values are normalized to $-1$, $-2$, and $-1$.

16. The mass storage device of claim 11 wherein said three positive target values are other than 1, 2, and 1, and said three negative target values are other than $-1$, $-2$, and $-1$.

17. The mass storage device of claim 11 wherein said track identification indicia are adapted to be processed by a Viterbi detector having only allowed trellis paths that are separated by a distance larger than a minimum path distance.

18. The mass storage device of claim 11 wherein said track identification indicia are adapted to be processed by a Viterbi detector having only allowed trellis states that are separated by a distance larger than a minimum Hamming distance.

19. The mass storage device of claim 11 wherein said track identification indicia are adapted to be processed by a Viterbi detector having only allowed trellis states that are separated by a distance larger than a minimum Euclidean distance.

* * * * *